United States Patent [19]
Blickstein et al.

[11] Patent Number: 4,459,635
[45] Date of Patent: Jul. 10, 1984

[54] MULTI-TURN TRIMMER

[75] Inventors: Martin J. Blickstein, Austell; John B. Beckman, Cedartown, both of Ga.

[73] Assignee: Murata Erie North America, Inc., Marietta, Ga.

[21] Appl. No.: 492,489

[22] Filed: May 6, 1983

[51] Int. Cl.³ .............................................. H01G 5/06
[52] U.S. Cl. .................................................. 361/293
[58] Field of Search ........................ 361/292, 293, 298

[56] References Cited

U.S. PATENT DOCUMENTS

| | | | |
|---|---|---|---|
| 1,141,626 | 6/1915 | Granville | 74/805 |
| 1,589,204 | 6/1926 | Miller | 361/295 |
| 1,939,030 | 12/1933 | Wood | 33/170 |
| 1,942,794 | 1/1934 | Benson | 74/35 |
| 2,658,395 | 11/1953 | Coates | 74/10.52 |
| 2,903,893 | 9/1959 | Scott et al. | 74/10.2 |
| 3,069,914 | 12/1962 | Laubenfels | 74/10.2 |
| 3,336,515 | 8/1967 | Seiden | 361/295 |
| 3,382,421 | 5/1968 | Hirschberg | 361/295 |
| 3,560,811 | 2/1971 | Farago | 361/294 |
| 3,686,608 | 8/1972 | Wahlberg | 361/292 X |
| 4,035,697 | 7/1977 | Arnold | 361/289 |
| 4,264,942 | 4/1981 | Iri et al. | 361/298 X |
| 4,283,751 | 8/1981 | Tatsumi | 361/293 |

OTHER PUBLICATIONS

Trimming Potentiometers, Catalog No. 57-11, Murata Erie North America, Inc.
Discover . . . Our World of Precision Multi-Turn Trimming Potentiometers, Murata Erie North America, Inc.

*Primary Examiner*—Donald A. Griffin
*Attorney, Agent, or Firm*—George M. Thomas

[57] ABSTRACT

An electronic device such as a multi-turn trimming capacitor and potentiometer has two conductive elements and means for rotating one element with respect to the other. The rotating means includes a drive member coupled with one conductive element such that an angular displacement of the drive member with respect to the other conductive element imparts less angular displacement to the one conductive element with respect to the other conductive element. Rotation of the one element is achieved while sealing both elements from ambience.

31 Claims, 6 Drawing Figures

MULTI-TURN TRIMMER

TECHNICAL FIELD

This invention relates to multi-turn electric trimming devices such as multi-turn trimming capacitors and multi-turn trimming potentiometers.

BACKGROUND OF THE INVENTION

Ideally, trimming capacitors and potentiometers should have multi-turn trimming capability, be sealed from ambience, and be inexpensive to manufacture. This combination of features, however, has yet to be achieved in the devices of the prior art.

Unsealed trimming capacitors and potentiometers may possess the multi-turn character by having an excentric gear arrangement that provides multi-turn trimming capabilities. They may also be made relatively inexpensive to manufacture by having one gear compactly located within the bounds of another gear which may be turned by simply rotating an externally accessible gear shaft. This open design however presents several problems, most being attributable to the fact that chemical solutions may form within the device through the ingress of various agents from ambience. These solutions tend to modify the operational characteristics of the dielectric. Such unsealed devices also tend not to meet stringent salt spray and humidity test specifications. Furthermore, costly production controls must normally be employed in producing the devices to prevent solvents and degreasers from damaging them during manufacture.

Sealed trimmers, of course, do exist but they usually are of the fractional-turn type and thus have poor resolution and are difficult to set accurately and to remain accurately set without drifting. Concentric ring trimmers, which do possess multi-turn capabilities, may be capped so as to be sealed. An example of such a sealed, multi-turn trimmer is the model 1102 trimming potentiometer manufactured by Murata Erie North America Inc. with a planetary gear drive. Again, it is relatively large and expensive to manufacture.

Thus, there remains a need to provide a multi-turn sealed trimmer, such as a trimming capacitor and a trimming potentiometer, which is relatively inexpensive to manufacture. It is the provision of such trimmers to which the present invention is therefore primarily directed.

SUMMARY OF THE INVENTION

In one form of the invention a disc trimmer has two conductive elements and means for rotating one element with respect to the other. The rotating means includes a drive member coupled with one conductive element such that an angular displacement of the drive member with respect to the other conductive element imparts less angular displacement to the one conductive element with respect to the other conductive element.

In another preferred form of the invention a multi-turn trimming capacitor has a stator electrode, a rotor electrode spaced from the stator electrode, a rotor gear having a set of teeth mounted to the rotor electrode, and a peristaltic gear having a set of resilient teeth facing the rotor gear set of teeth with the peristaltic gear set of teeth and the rotor gear set of teeth being of dissimilar number. The capacitor also has means for successively urging teeth of the peristaltic gear set of teeth into and out of engagement with the rotor gear to rotate the rotor gear and rotor electrode with respect to the stator electrode.

In another form of the invention, a capacitor comprises a case having an annular resilient section, a stator electrode mounted to the case, a rotor rotatably mounted within the case that carries a rotor electrode spaced from the stator electrode, and drive means rotatably mounted to the case for orbitably urging successive portions of the case resilient section into driving engagement with the rotor.

In yet another preferred form of the invention, a multi-turn trimming potentiometer has a conductive element, an elongated resistive element spaced from the conductive element, a rotor having a set of gear teeth and carrying a conductive wiper in sliding engagement with the elongated resistive element and electrically coupled with the conductive element, and a peristaltic gear having a set of resilient teeth facing the rotor gear set of teeth with the peristaltic gear set of teeth and the rotor gear set of teeth being of dissimilar number. The potentiometer also has means for successively urging teeth of the peristaltic gear set of teeth into and out of engagement with the rotor gear to rotate the rotor gear and move the conductive wiper in sliding contact upon the elongated resistive element.

In still another form of the invention a potentiometer comprises a case having an annular resilient action, a stator mounted to the case having an elongated, resistive element located about a conductive element, and a rotor rotatably mounted within the case that carries a conductive wiper in sliding contact with the elongated resistive element and the conductive element. The potentiometer also comprises drive means rotatably mounted to the case for orbitably urging successive portions of the case resilient section into driving engagement with the rotor.

In still another form of the invention, a method of rotating a rotor within an encapsulating case comprises the steps of providing the rotor with an annular array of rotor teeth and the case with an annular array of resilient teeth positioned in spaced relation around the rotor set of teeth with the number of teeth in the annular array of rotor teeth differing from the number of teeth in the annular array of resilient teeth, and successively urging teeth of the annular array of resilient teeth into and out of driving engagement with teeth of the annular array of rotor teeth.

DETAILED DESCRIPTION

Figure 1:
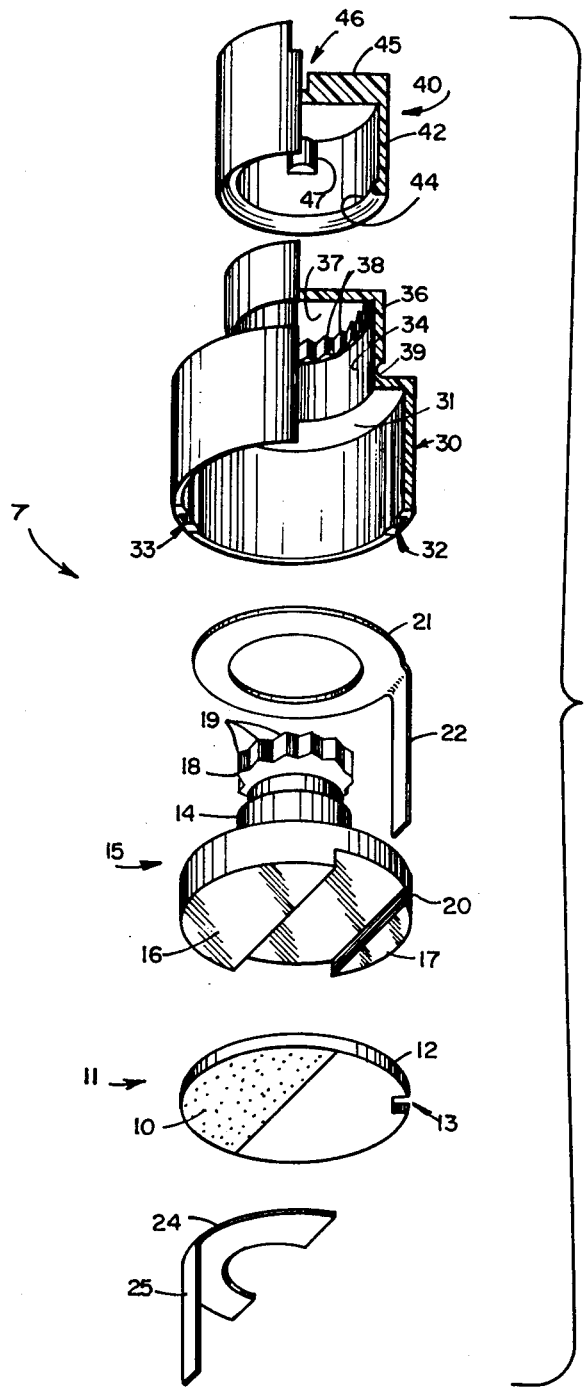
FIG. 1 is an exploded view, in perspective, of a multi-turn trimming capacitor embodying principles of the invention in one preferred form.
Figure 2:
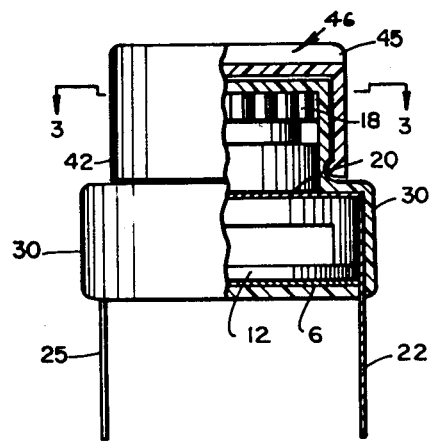
FIG. 2 is a side elevational view of the capacitor illustrated in FIG. 1 with a portion thereof shown broken away to reveal internal components.
Figure 3:
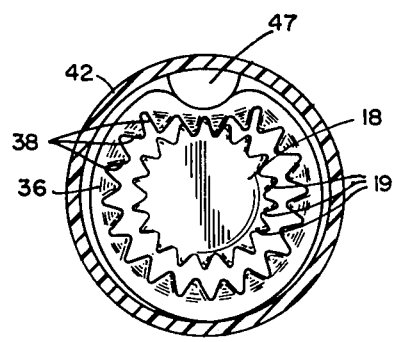
FIG. 3 is a cross-sectional view of the capacitor illustrated in FIGS. 1 and 2 taken along plane 3—3.

Referring now in more detail to the drawing, there is shown in FIGS. 1–3 a multi-turn trimming capacitor 7 having a stator 11 which comprises a half-disc shaped stator electrode 10 formed as a metallic coating on a portion of the bottom surface of the disc shaped dielectric 12 formed with a peripheral slot 13. A rotor, generally indicated at 15, is rotatably mounted atop the stator with a half-disc shaped rotor electrode 16 on the bottom of a metallic rotor base 20 located in sliding abutment with the upper surface of the dielectric 12. The rotor also has a foot 17 spaced from the electrode 16 which also is in sliding abutment upon the upper surface of the stator for support balance. The rotor also has an external type rotor gear 18, formed with eighteen regularly spaced teeth 19 formed of a metallic material which is located above a bearing surface 14. A ring-like rotor contact 21 is mounted flush atop the rotor base 20 from which a rotor contact terminal 22 downwardly projects beside the rotor base and through a stator slot 13 to ambience. A stator contact 24 of semi-circular configuration is placed flush against the stator electrode 10 from which a stator contact terminal 25 downwardly projects to ambience.

The capacitor also has a plastic case 30 which initially is in a generally cup-shape configuration as shown in FIG. 1 during assembly of the capacitor components. The case is provided with two elongated slots 32 and 33 sized to accommodate the terminals 22 and 25, respectively, which extend to an annular ledge 31. The case has an upper, annular sleeve-like section, generally indicated at 36, which is formed of a relatively soft, resilient plastic and which has an internal gear-like structure formed with twenty inwardly facing teeth 38, which may be referred to as peristaltic teeth, located above a cylindrical sleeve bore 34. In their relaxed configuration the teeth 38 confront but are in spaced relation with the set of rotor teeth 19. During assembly of the capacitor the bottom portion of the case 30 is molded under the stator 12 and stator contact 24 and sealed thereto as shown in the assembled illustration of FIG. 2 so as to encapsulate the rotor. During this sealing operation two apertures are formed at the lower corners of the case along the slots 32 and 33 to provide exits for the terminals 22 and 25.

The capacitor is further seen to include a drive member 40 in the shape of a cap or capped sleeve having cylindrical side walls 42 formed with an inwardly projecting lip 44 at the bottom thereof that may be snap-fitted into an annular recess 39 of the case 30 so as to retain the drive member rotatably attached to the case. The drive member has an upper end wall 45 formed with a slot 46 thereacross to accommodate a screwdriver used in rotating the drive member upon the case. The drive member is formed with an inwardly directed projection 47 which juts inwardly a distance sufficiently to deform the resilient section 36 of the case once the drive member is attached to the case. This deformation is sufficient to urge at least one tooth 38 into driving engagement with the teeth 19 of the rotor 18.

In operation the contact terminals 22 and 25 may be electrically connected in an electric circuit so as to provide capacitance between the stator electrode 10 and the rotor electrode 16 which are spaced apart by the dielectric 12. The magnitude of the capacitance may be adjusted by rotating the rotor electrode 16 with respect to the stator electrode 10. By reference to FIG. 1 it is seen that rotary movement of the rotor alters the area of the rotor electrode which overlies and confronts the stator electrode. This alteration may vary between one extreme where the semi disc-shaped rotor electrode completely overlies the semi disc-shaped stator electrode and the other extreme where the rotor electrode overlies no portion of the stator electrode. Intermediary positions are, of course, possible where a portion of the rotor electrode overlies the stator electrode while another portion does not.

To effect a change in the relative position of the rotor electrode to the stator electrode the drive member 40 is rotated as by the use of a screwdrive inserted into the slot 46. As the drive member 40 is turned it is seen from FIG. 3 that the protrusion 47 will orbit about the generally circular surface of the resilient annular section 36 of the case 30. As this occurs the teeth 38 of the case are successively urged generally radially into and out of driving engagement with the teeth 19 of the rotor 18 with a peristaltic-like action. Since the case has two more teeth than the rotor the rotor is forced to rotate in conjunction with the orbital movement of the drive member and its projection 47. It should however be understood that the case 36 and its gear-like structure do not rotate during this maneuver. Since the case has twenty teeth while the rotor has only eighteen, a 360° revolution of the drive member 40 will cause the rotor 15 to be rotatably displaced through the angle separating two of the rotor teeth. Thus, one revolution of the drive member 40 causes the rotor to be rotated 2/18ths or 1/9th revolution. In this manner the capacitor is provided with a multi-turn trimming capability. And, since the rotor is completely encapsulated within the case 30 this multi-turn facet is achieved with the capacitor electrodes being continuously sealed from ambience. Once the device has been set the drive member 75 may be removed by unsnapping the lip 44 to prevent the capacitor from being accidently reset at a later date.

Figure 4:
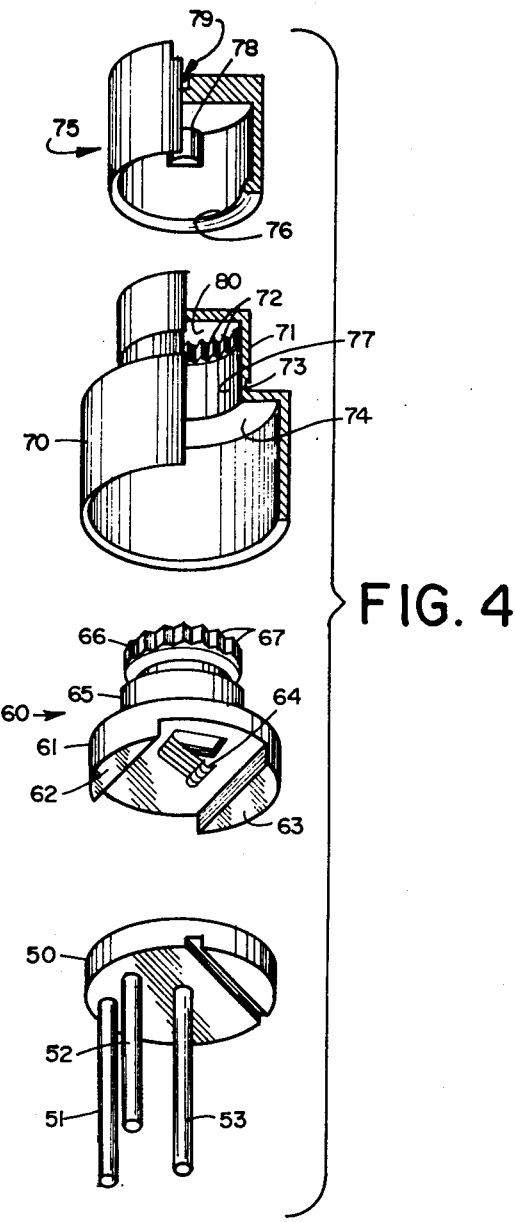
FIG. 4 is an exploded view, in perspective, of a multi-turn trimming potentiometer embodying principles of the invention in one preferred form.
Figure 5:
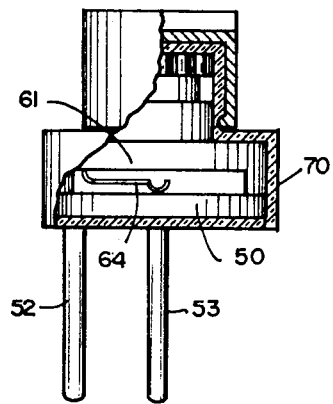
FIG. 5 is a side elevational view of the potentiometer illustrated in FIG. 4 with a portion thereof shown broken away to reveal internal components.
Figure 6:
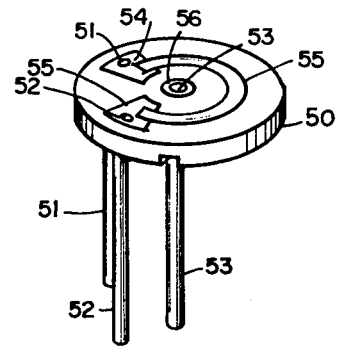
FIG. 6 is a perspective view of the stator component of the potentiometer illustrated in FIGS. 4 and 5.

With reference next to FIGS. 4–6 there is shown a multi-turn trimming potentiometer that embodies principles of the invention. The potentiometer is seen to include a stator having a disc-shape substrate 50 through which three terminals 51, 52 and 53 pass to terminate on the upper surface thereof. An electrically conductive land 54 is provided atop the substrate 50 encompassing the end of terminal 51 so as to be electrically connected thereto. Similarly, an electrically conductive land 55 is formed upon the upper surface of the substrate surrounding the end of the terminal 52 and being electrically connected thereto but spaced from the land 54. An arcuate, resistive element 55 is also formed on the upper surface of the substrate electrically connecting the land 54 and 55. A circular island 56 is formed upon the upper surface of the substrate surrounding and electrically joined to the end of the terminal 53 but spaced from both of the lands 54 and 55 and the resistive element 55.

The potentiometer is also seen to include a rotor generally indicated at 60, formed of a hard plastic material which has a base 61 formed with two spaced feet 62 and 63 that have coplanar surfaces which may be slidably mounted atop the stator substrate. A multi-fingered, electrically conductive wiper 64 is mounted to the bottom of the base between the two feet 62 and 63 so as to be spring biased to a contact position below the common plane of the lower surfaces of the two feet 62 and 63. The rotor is also provided at its upper end, above a bearing surface 65, with an external gear 66 formed with an angular array of eighteen teeth 67.

The potentiometer also includes a plastic case 70 having an open lower end that is, during assembly of the device, wrapped around the bottom of the stator substrate and sealed thereto with the terminals 51, 52 and 53 extending therethrough, as shown in FIG. 5. As in the previously described capacitor this case also has a resilient, annular sleeve-like section 71 located above ledge 74 the interior surface of which is formed of a gear-like structure having an annular arrayed set of twenty inwardly facing teeth 72 in the general configuration of a ring gear located above a cylindrical bore 77. In this case, however, the case is not provided with longitudinally extending slots since the potentiometer terminals 51–53 project through the stator substrate 50. The device does however have an annular recess 73 for receiving in snap fitting fashion an annular lip 76 of a drive member 75. The drive member here is of the identical configuration of that shown in FIG. 1 having an exterior slot 79 to accommodate a screwdriver as member 40 in FIG. 1. Thus, the drive member is in the shape of a cup, an interior cylindrical surface from which an inwardly directed projection 78 juts sufficiently to deform the case teeth 72 so as to drive the rotor teeth 66 as previously described in the operation of the trimming capacitor.

Once assembled and in operation the drive member 75 may be revolved through a number of revolutions causing the protrusion 78 to orbit about the case 70 and successively urge the case teeth 72 into driving engagement with the rotor teeth 67, as previously described. Again, with the rotor teeth being eighteen in number and the case teeth being twenty in number the rotor is caused to rotate through a relatively small angle in response to the drive member being rotated through a relatively large angle. As is well known, rotation of the potentiometer rotor causes the wiper blade 64 to move along the arcuate resistive element 55 while maintaining constant contact with the central land 56.

It thus is seen that relatively inexpensive, sealed electronic devices are now provided which have multi-turn trimming capabilities. It should be understood, however, that the just described embodiments merely illustrate principles of the invention in two preferred forms. Many modifications, additions and deletions may, or course, be made thereto without departure from the spirit and scope of the invention as set forth in the following claims.

We claim:

1. A disc trimmer having two conductive elements and means for rotating one conductive element with respect to the other conductive element, said rotating means including a drive member coupled with said one conductive element such that an angular displacement of said drive member with respect to said other conductive element imparts less angular displacement to said one conductive element with respect to said other conductive element, and wherein said rotating means includes an external gear about which an internal gear is positioned with said external and internal gears having dissimilar numbers of teeth, and wherein the teeth of one of said gears is resilient and is less hard than the teeth of the other gear whereby teeth of the one gear may be deformably placed into and out of mesh with teeth of the other gear by said drive member.

2. A disc trimmer in accordance with claim 1 wherein the one gear is rigidly joined to said one conductive element whereby an angular displacement of said drive member imparts less angular displacement to said one conductive element.

3. A disc trimmer in accordance with claim 1 wherein the one gear is a ring gear having internal teeth and a resilient peripheral surface, and wherein said drive member is rotatably mounted about said one gear and has an internal surface in contact with only a portion of said one gear resilient peripheral surface and forcing a resilient tooth of the one gear adjacent the depressed portion into driving engagement with the other gear.

4. A disc trimmer in accordance with claim 1 wherein said one gear is rigidly joined to said other conductive element so as to encapsulate and seal said one conductive element from ambience.

5. A multi-turn trimming capacitor having a stator electrode, a rotor electrode spaced from said stator electrode, a rotor gear having a set of teeth mounted to said rotor electrode, a peristaltic gear having a set of resilient teeth facing said rotor gear set of teeth and with said peristaltic gear set of teeth and said rotor gear set of teeth being of dissimilar number; and means for successively urging teeth of said peristaltic gear set of teeth into and out of engagement with said rotor gear to rotate said rotor gear and said rotor electrode with respect to said stator electrode.

6. A multi-turn trimming capacitor in accordance with claim 5 wherein said peristaltic gear is mounted to said stator electrode.

7. A multi-turn trimming capacitor in accordance with claim 5 wherein said rotor gear is an external gear and said peristaltic gear is an internal gear.

8. A multi-turn trimming capacitor in accordance with claim 7 comprising a case to which said stator electrode and said peristaltic gear are mounted that encapsulates said rotor and said rotor gear so as to seal off said rotor electrode from ambience.

9. A multi-turn trimming capacitor in accordance with claim 5 wherein said peristaltic gear is a ring gear having a resilient peripheral surface and said rotor gear is an external gear, and wherein said urging means is mounted for rotation about said peristaltic gear peripheral surface in contact with only a portion thereof.

10. A multi-turn trimming capacitor in accordance with claim 9 wherein said urging means includes means for successively urging teeth of said peristaltic gear set of teeth generally radially into and out of engagement with said rotor gear.

11. A multi-turn trimming capacitor in accordance with claim 10 wherein said urging means comprises a sleeve having a generally cylindrical bore formed with an inwardly directed protrusion.

12. A capacitor comprising a case having an annular resilient section; a stator electrode mounted to said case; a rotor rotatably mounted within said case that carries a rotor electrode spaced from said stator electrode; and drive means rotatably mounted to said case for orbitably urging successive portions of said case resilient section into driving engagement with said rotor.

13. A capacitor in accordance with claim 12 wherein said case annular resilient section has a set of gear-like teeth and wherein said rotor has a set of gear-like teeth confronting said case set of teeth, and wherein the number of teeth in said case set exceed the number of teeth in said rotor set.

14. A capacitor in accordance with claim 12 wherein said case encapsulates said rotor electrode and said stator electrode so as to seal the electrodes from ambience.

15. A capacitor in accordance with claim 12 wherein said drive means comprises a sleeve rotatably mounted about said case having an inwardly directed protrusion in sufficient pressure contact with said case resilient section as to deform and urge portions thereof into driving engagement with said rotor.

16. A capacitor in accordance with claim 15 wherein said drive means is detachably mounted to said case.

17. A multi-turn trimming potentiometer having a conductive element, an elongated resistive element spaced from said conductive element, a rotor having a set of gear teeth and carrying a conductive wiper in sliding contact with said elongated resistive element and electrically coupled with said conductive element; a peristaltic gear having a set of resilient teeth facing said rotor gear set of teeth and with said peristaltic gear set of teeth and said rotor gear set of teeth being of dissimilar number; and means for successively urging teeth of said peristaltic gear set of teeth into and out of engagement with said rotor gear to rotate said rotor gear and move said conductive wiper in sliding contact upon said elongated resistive element.

18. A multi-turn trimming potentiometer in accordance with claim 17 wherein said peristaltic gear is rigidly connected with said conductive element and said elongated resistive element.

19. A multi-turn trimming potentiometer in accordance with claim 17 wherein said rotor gear is an external gear and said peristaltic gear is an internal gear.

20. A multi-turn trimming potentiometer in accordance with claim 19 comprising a case that encapsulates said rotor, said conductive element and said elongated resistive element so as to seal off said wiper, said conductive element and said elongated resistive element from ambience.

21. A multi-turn trimming potentiometer in accordance with claim 17 wherein said peristaltic gear is a ring gear having a resilient peripheral surface and said rotor gear is an external gear, and wherein said urging means is mounted for rotation about said peristaltic gear peripheral surface in contact with only a portion thereof.

22. A multi-turn trimming capacitor in accordance with claim 21 wherein said urging means includes means for successively urging teeth of said peristaltic gear set of teeth generally radially into and out of engagement with said rotor gear.

23. A multi-turn trimming capacitor in accordance with claim 22 wherein said urging means has a generally cylindrical bore formed with an inwardly directed protrusion.

24. A potentiometer comprising a case having an annular resilient section; a substrate mounted in said case and having an elongated resistive element located about a conductive element; a rotor rotatably mounted within said case that carries a conductive wiper in sliding contact with said elongated resisitive element and said conductive element; and drive means rotatably mounted to said case for orbitably urging successively portions of said case resilient section into driving engagement with said rotor.

25. A potentiometer in accordance with claim 24 wherein said case annular resilient section has a set of gear-like teeth and wherein said rotor has a set of gear-like teeth confronting said case set of teeth, and wherein the number of teeth in said case set exceeds the number of teeth in said rotor set.

26. A potentiometer in accordance with claim 24 wherein said case encapsulates said rotor wiper and said substrate resistive element and conductive element so as to seal the wiper from ambience.

27. A potentiometer in accordance with claim 24 wherein said drive means comprises a sleeve rotatably mounted about said case having an inwardly directed protrusion in sufficient pressure contact with said case resilient section as to deform and urge a portion thereof into driving engagement with said rotor.

28. A potentiometer in accordance with claim 27 wherein said drive means is detachably mounted to said case.

29. The method of rotating a rotor within an encapsulating case comprising the steps of:
(a) providing the rotor with an annular array of rotor teeth and the case with an annular array of resilient teeth positioned in spaced relation about the rotor teeth with the number of rotor teeth differing from the number of resilient teeth; and
(b) successively urging teeth of said annular array of resilient teeth into and out of driving engagement with teeth of said annular array of rotor teeth.

30. The method of claim 29 wherein step (b) an annular sleeve having an inwardly directed protrusion is rotated about the case.

31. The method of claim 29 wherein step (b) the teeth of said annular array of resilient teeth are urged generally radially into and out of driving engagement with teeth of said annular array of rotor teeth.

* * * * *